Nov. 27, 1923.

W. R. McGOWEN 1,475,347

AUTOMOBILE BUMPER

Filed Feb. 17 1923

Inventor.
William R. McGowen,

Nov. 27, 1923.  W. R. McGOWEN  1,475,347
AUTOMOBILE BUMPER
Filed Feb. 17, 1923    2 Sheets-Sheet 2
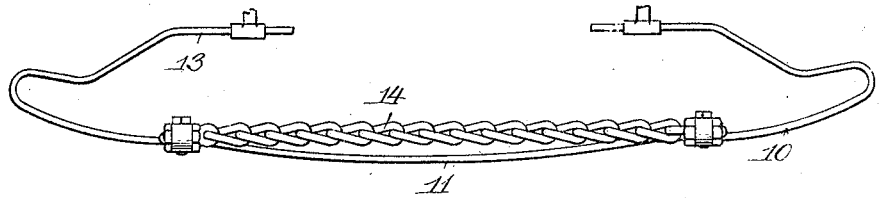
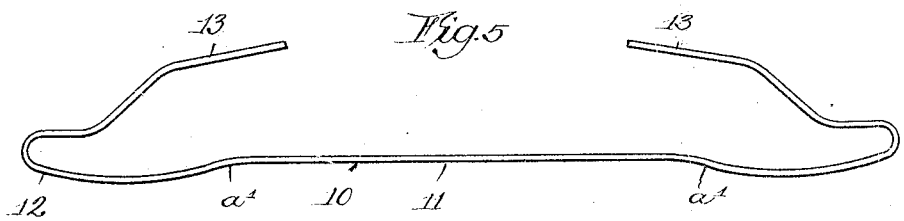
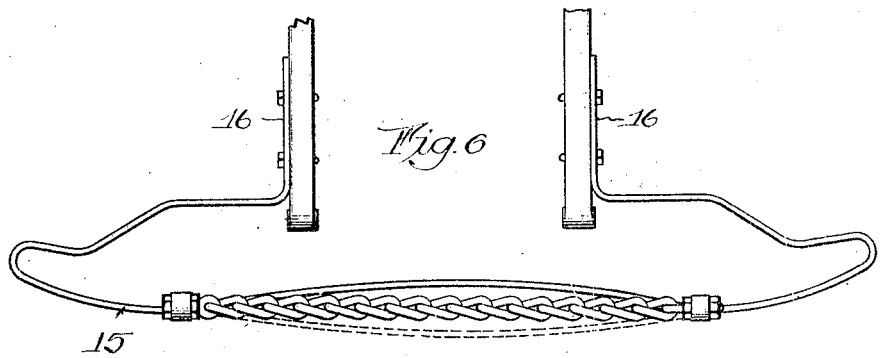

Patented Nov. 27, 1923

1,475,347

UNITED STATES PATENT OFFICE.

WILLIAM R. McGOWEN, OF CHICAGO, ILLINOIS, ASSIGNOR TO AMERICAN BUMPER COMPANY, OF CHICAGO, ILLINOIS, A CORPORATION OF ILLINOIS.

AUTOMOBILE BUMPER.

Application filed February 17, 1923. Serial No. 619,563.

*To all whom it may concern:*

Be it known that I, WILLIAM R. McGOWEN, a citizen of the United States, and a resident of Chicago, in the county of Cook and State of Illinois, have invented certain new and useful Improvements in Automobile Bumpers, of which the following is a specification.

This invention relates to improvements in automobile bumpers, and more particularly to automobile bumpers characterized as of the spring bar type, with the additional feature of a flexible member extending throughout the forward or impact section of the bumper.

A preferable embodiment of the invention consists of a single bar bent or shaped to provide an impact portion with looped or U-shaped ends terminating in rear end portions adapted for attachment to the ends of the vehicle frame members. Extending throughout the central portion are one or more lengths of chain or like flexible members secured at its ends to the bar and offset above and below, in parallel relation to said bar. The purpose of the chain is to provide an increased impact area with a view to affording greater protection especially against obstacles which otherwise would ride over or under the single resilient bar.

In the use of chain or like flexible members it is desirable that such chain shall be maintained under a constant tension in order to prevent sagging and to eliminate vibration.

The object of the present invention is to provide a novel treatment for the resilient bar, whereby the desired degree of tension is imparted to the chains, and the structure of the bumper otherwise strengthened.

In the accompanying drawings, several adaptations of the same treatment are disclosed.

Figure 4 is a top plan view of a bumper which is distinguished from that shown in Figure 2 by the reversed curvature of the bar intermediate the ends of the chains;

Figure 5 is a view of the bar of the bumper of Figure 4 as it is initially shaped;

Figure 6 is a top plan view of the bumper shown in Figure 2, modified as to the method of attachment.

Figure 1:
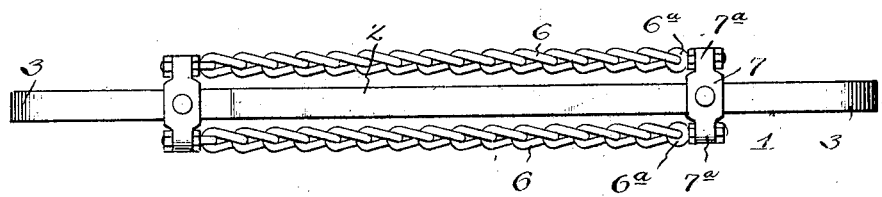
Figure 1 is a view in front elevation of a bumper embodying the features common to all forms embodying the invention.
Figure 2:
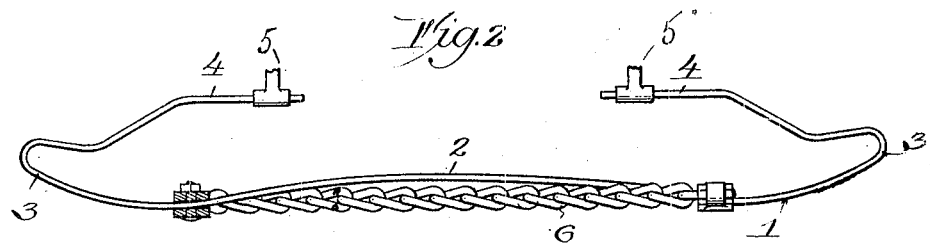
Figure 2 is a top plan view of a bumper as attached to a vehicle and showing the preferred embodiment of the invention.

Figures 1 and 2 clearly reveal a bumper having the general features of construction already described, namely, a flat bar 1 of resilient or spring steel, shaped or formed to provide the forward impact portion 2, looped or U- aped end portions 3, 3 and the rear end portions 4, 4, formed by continuing the free ends of the looped portions, rearwardly and inwardly in parallel relation to the forward portion of the bar. Brackets 5, 5, preferably comprising clamping blocks, engage the rear end portions 4, 4, and are mounted at the ends of the vehicle frame members.

Extending parallel with the impact section 2 of the bar 1 are lengths of chain 6, 6, which are secured at points inwardly from the ends of the bumper, by means of plates 7, 7, extending transversely of the bar 1 and clamped or riveted thereto. At the ends of the plates are formed eyes 7ª, 7ª, which receive eye bolts 6ª, 6ª, at the ends of the chains, thereby providing a convenient and secure method of attachment.

Figure 3:
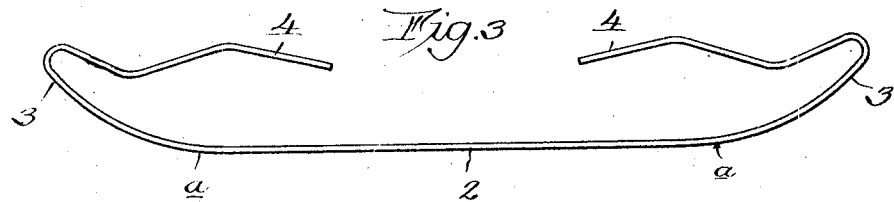
Figure 3 is a detail plan view of the bumper bar in its initial form before the chains are attached.

Referring to Figure 3, the contour of the bar 1 is shown in its initial form, and without the chains 6, 6 attached. A comparison of the bar 1 as it appears in Figure 3 and as it appears in Figure 2, discloses the fact that it has undergone considerable distortion, as would be seen if the bar of Figure 3 were superimposed on the same bar in Figure 2. Considering first the forward portion 2, it is apparent that in its initial shape, the bar is perfectly straight throughout the portions between points *a, a,* (Figure 3) which may represent the points of attachment of the chain plates 7, 7, in the assembled bumper. Beyond these points *a, a,* a distinct rearward curvature is evident, which continues to the U-shaped extremities of the bumper ends 3, 3. In this connection it is to be observed that the curvature of the bar is more pronounced between the points *a, a,* and the extreme bumper ends, with the result that said ends are disposed a greater distance rearwardly from the forward portion 2 of the bar, than they are in the assembled bumper of Figure 2. It also follows that the rear end portions of the bar, beyond the U-shaped extremities, are correspondingly distorted, this being especially noticeable in the end portions 4, 4, which incline inwardly toward the forward portion 2, or to use a familiar expression, they "toe in."

In applying the chains 6, 6, to the bar of Figure 3, after the attachment of the plates 7, 7, at the points a, a, sufficient initial tension or shortening of the chains is provided so that the portion of the bar 2 between said points of attachment is bowed or curved rearwardly, as shown in Figure 2, said portion thus assuming the character of a spring under distortion and having an inherent tendency to resume its initial straightened form. It follows, therefore, that the chains are placed under tension and in a degree determined by the curvature of the bar between the points of connection.

The distortion of the portion 2 of the bar by the application of the chains is accomplished by a resultant distortion of the end portions of the bar, namely, a straightening out of the curved portion between points a, a, and the bumper ends, the U-shaped ends being thrown forwardly and the rear end portions 4, 4, carried into a position parallel to the chains 6, 6. Thus the bumper assumes a rigid form, and when secured to a vehicle by the brackets 5, 5, retains its final form with the chains 6, 6, under tension.

The advantage of placing the chains under tension is quite evident. When the bumper is mounted on a vehicle, even though not subjected to the impact of collision, all tendency for the chains to vibrate is eliminated and any looseness that might develop is taken up, which otherwise might produce a sagging of the chains.

The added tautness or tension of the chains produces a more rigid structure in resisting an impact when a collision occurs. In such an event the chains being under an initial tension, the resistance offered to the flexing of the chains is proportionately greater, as well as resistance offered by the bar itself to distortion under the forces transmitted to it from the chains.

In Figures 4 and 5, a similar but reversed effect is produced in the bar 10, whereby the central portion 11 thereof is bowed or curved forwardly instead of rearwardly, To attain this reversal, the initial shaping of the bar (Figure 5) is somewhat different. The forward portion 11 is straight, as before, but instead of a rearward curve or bend at the points of attachment $a'$, $a'$, of the chain plates, there is a decided forward offset, thus carrying the extremities of the bumper 12, 12, forwardly of their final position. It follows also that the rear end portions 13, 13, are inclined away, or "toe out" from the front portion of the bar. Assembling the chains 14, 14, in the manner already described, the bar assumes a somewhat similar shape, with the exception that the portion 11 of the bar between the points of attachment is curved outwardly instead of inwardly. The effect of this reversal is to apply tension to the chains as before, but with the added distinction that it produces a much more rigid structure and less yieldable under impact. This is quite apparent, since a blow received against the portion 11 of the bar would tend to straighten it with the result that it would be resisted by the tension of the non-flexible chains. Under a heavy blow, it is entirely possible that the bar would be bent to the reverse curvature, as shown in Figure 6 whereupon the force of the blow would be transferred to the chains and the bar become the resisting element against the flexing of the chains.

Being normally a more rigid structure, the type of bumper shown in Figures 4 and 5 would be more suitable for the rear end of vehicles, for the reason that a rear bumper should properly be longer than a front bumper in order to afford protection to the fenders and other parts mounted at the rear, and for the further reason that the points of attachment with the vehicle are spaced a greater distance apart. Hence the desirability of greater rigidity in such a bumper.

In Figure 6 a similar type of bumper is shown, differing only in that the bar 15 terminates in rearwardly extending arms 16, 16, which are clamped flatwise against the sides of the frame members. Otherwise, the initial treatment of the bar and the assembling of the chains is carried out in the manner already described, to provide either formation of the front portion of the bar.

Having described the purpose of, and method of obtaining the structure embodying the invention, I claim—

1. An automobile bumper having an impact member comprising a normally straight resilient bar, a flexible member extending parallel with and attached at its ends to said bar, the portion of said bar intermediate the points of attachment being distorted into a curved line by said flexible member.

2. An automobile bumper having an impact member comprising a normally straight resilient bar, a flexible member connected at its ends at points longitudinally spaced apart along said bar, the portion of said bar intermediate said points of connection being distorted into curvilinear shape, thereby placing said flexible member under tension.

3. An automobile bumper comprising a resilient bar having a normally straight forward portion and a flexible member connected to said bar at longitudinally spaced points, said flexible member being placed under tension by distorting the portion in- termediate said points of connection horizon- tally and in curvilinear conformation.

4. An automobile bumper having an im- pact member comprising an initially straight central portion, a chain attached at its ends to said bar and extending throughout said central portion in vertical offset relation thereto, said central portion being initially curved transversely, whereby said chain is permanently placed under tension.

5. An automobile bumper having an im- pact member comprising an initially straight central portion, chains extending above and below said bar throughout said central por- tion and connected at its ends thereto, said bar being distorted into curvilinear form and rearwardly of said chains, thereby plac- ing said chains in permanent tension.

6. An automobile bumper comprising a bar bent to form a substantially straight forward portion, U-shaped end portions and rear- wardly disposed attaching portions, a flex- ible member attached at its ends to said for- ward portion, the length of said flexible member being less than the length of said bar intermediate the points of attachment whereby said bar is distorted out of straight line and said flexible member placed under tension.

7. An automobile bumper comprising a bar initially bent to form a forward im- pact portion having a straighht central por- tion and rearwardly curved end portions ter- minating in U-shaped extremities, the free ends of said bar forming rearwardly dis- posed attaching portions extending inwardly from the ends of the bumper at an acute an- gle to said straight central portion, and a flexible member connected at its ends to said bar adjacent the ends of said central portion, and the latter distorted into curvilinear form whereby said flexible member is placed un- der tension and the rearwardly attaching end portions brought into parallel relation with said flexible member.

In witness whereof, I hereunto subscribe my name this 13th day of February, A. D., 1923.

WILLIAM R. McGOWEN.